United States Patent
Sato

(10) Patent No.: US 9,821,566 B2
(45) Date of Patent: Nov. 21, 2017

(54) INK SUPPLY DEVICE AND INKJET RECORDING DEVICE

(71) Applicant: TOSHIBA TEC KABUSHIKI KAISHA, Shinagawa-ku, Tokyo (JP)

(72) Inventor: Tetsuya Sato, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/407,364

(22) Filed: Jan. 17, 2017

(65) Prior Publication Data
US 2017/0291425 A1    Oct. 12, 2017

(30) Foreign Application Priority Data

Apr. 7, 2016    (JP) .................................. 2016-077387

(51) Int. Cl.
*B41J 29/393* (2006.01)
*B41J 2/175* (2006.01)
*G01F 25/00* (2006.01)

(52) U.S. Cl.
CPC .......... *B41J 2/17566* (2013.01); *B41J 29/393* (2013.01); *G01F 25/0069* (2013.01); *B41J 2002/17576* (2013.01)

(58) Field of Classification Search
CPC ........... B41J 2/1756; B41J 2002/17576; G01F 25/0069
See application file for complete search history.

(56) References Cited

U.S. PATENT DOCUMENTS

| 5,136,309 A * | 8/1992 | Iida ..................... | B41J 2/17566 |
| | | | 250/231.19 |
| 2002/0033855 A1* | 3/2002 | Kubota ................ | B41J 2/17513 |
| | | | 347/19 |
| 2006/0288777 A1 | 12/2006 | Lazaris | |
| 2007/0222839 A1* | 9/2007 | Sasaki .................. | B41J 2/17513 |
| | | | 347/86 |
| 2009/0262153 A1 | 10/2009 | Tamaki et al. | |
| 2014/0034140 A1* | 2/2014 | Dan ..................... | B41J 2/17506 |
| | | | 137/2 |
| 2016/0059571 A1* | 3/2016 | Kobayashi .......... | B41J 2/17513 |
| | | | 347/7 |
| 2017/0136776 A1* | 5/2017 | Shiba ................... | B41J 2/17566 |

FOREIGN PATENT DOCUMENTS

JP    WO 2008038796 A1 *    4/2008    .......... B41J 2/17566

* cited by examiner

*Primary Examiner* — Julian Huffman
(74) *Attorney, Agent, or Firm* — Amin, Turocy & Watson LLP

(57) ABSTRACT

In accordance with an embodiment, an ink supply device comprises an ink storage section, a float and a floating position detection device. The ink storage section is connected with an inkjet head, and stores ink to be supplied to the inkjet head. The float is arranged in the ink storage section in a floatable manner in response to a height of a liquid surface of the ink. The floating position detection device comprises a detection target arranged on the float, and a target detection section which is arranged in the ink storage section and detects that the detection target approaches. The target detection section is arranged on a wall substantially orthogonal to an axial direction of a rotating shaft of the ink storage section. An inkjet recording device of the embodiment comprises an inkjet head configured to jet ink to an image receiving medium, and the ink supply device.

19 Claims, 5 Drawing Sheets

INK SUPPLY DEVICE AND INKJET RECORDING DEVICE

CROSS-REFERENCE TO RELATED APPLICATIONS

This application is based upon and claims the benefit of priority from Japanese Patent Application No. P2016-077387, filed Apr. 7, 2016, the entire contents of which are incorporated herein by reference.

FIELD

Embodiments described herein relate generally to an ink supply device, an inkjet recording device, and methods associated therewith.

BACKGROUND

An inkjet recording device is provided with an inkjet head for jetting ink to an image receiving medium such as a sheet and an ink supply device for supplying ink to the inkjet head. The ink supply device is provided with an ink storage section for temporarily storing ink to be supplied to the inkjet head. Liquid measure and pressure of the ink in the ink storage section are detected by a suitable detection module, and controlled to constantly maintain proper liquid measure and pressure (for example, see Japanese Unexamined Patent Application Publication No. 2003-193980, and Japanese Unexamined Patent Application Publication No. 2001-310484).

In the conventional ink supply device, a float which floats corresponding to a height of a liquid surface of the ink is arranged in the ink storage section in a floatable manner. The height of the liquid surface of the ink in the ink storage section is detected by a floating position detection device for detecting a floating position of the float. The float is supported rotatably around the rotating in the ink storage section shaft. The floating position detection device is provided with a permanent magnet serving as a detection target arranged on the float and a magnetic detection sensor serving as a target detection section arranged on a vertical wall or a bottom wall of the ink storage section along an axial direction of the rotating shaft of the float.

However, in the conventional ink supply device, when the magnetic detection sensor serving as the target detection section is arranged on the vertical wall or the bottom wall of the ink storage section along the axial direction of the rotating shaft of the float, a setting position of the magnetic detection sensor capable of stably detecting a position of the detection target is restricted.

DETAILED DESCRIPTION

In accordance with an embodiment, an ink supply device comprises an ink storage section, a float and a floating position detection device. The ink storage section is connected with an inkjet head, and stores ink to be supplied to the inkjet head. The float is arranged in the ink storage section in a floatable manner in response to a height of a liquid surface of the ink. The floating position detection device comprises a detection target arranged on the float, and a target detection section which is arranged in the ink storage section and detects that the detection target approaches. The target detection section is arranged on a wall substantially orthogonal to an axial direction of a rotating shaft of the ink storage section.

In accordance with another embodiment, an inkjet recording device comprises an inkjet head configured to jet ink to an image receiving medium, and the ink supply device.

In accordance with yet another embodiment, a method of monitoring ink supply for an inkjet head involves storing ink in an ink storage section to be supplied to an inkjet head; floating a float on a liquid surface of the ink to indicate a height of the ink in the ink storage section; detecting a floating position of the float in the ink storage section; supporting the float rotatably around a rotating shaft in the ink storage section; and detecting an approaching detection target on the float, wherein a target detection section is arranged on a wall substantially orthogonal to an axial direction of the rotating shaft of the ink storage section.

Figure 1:
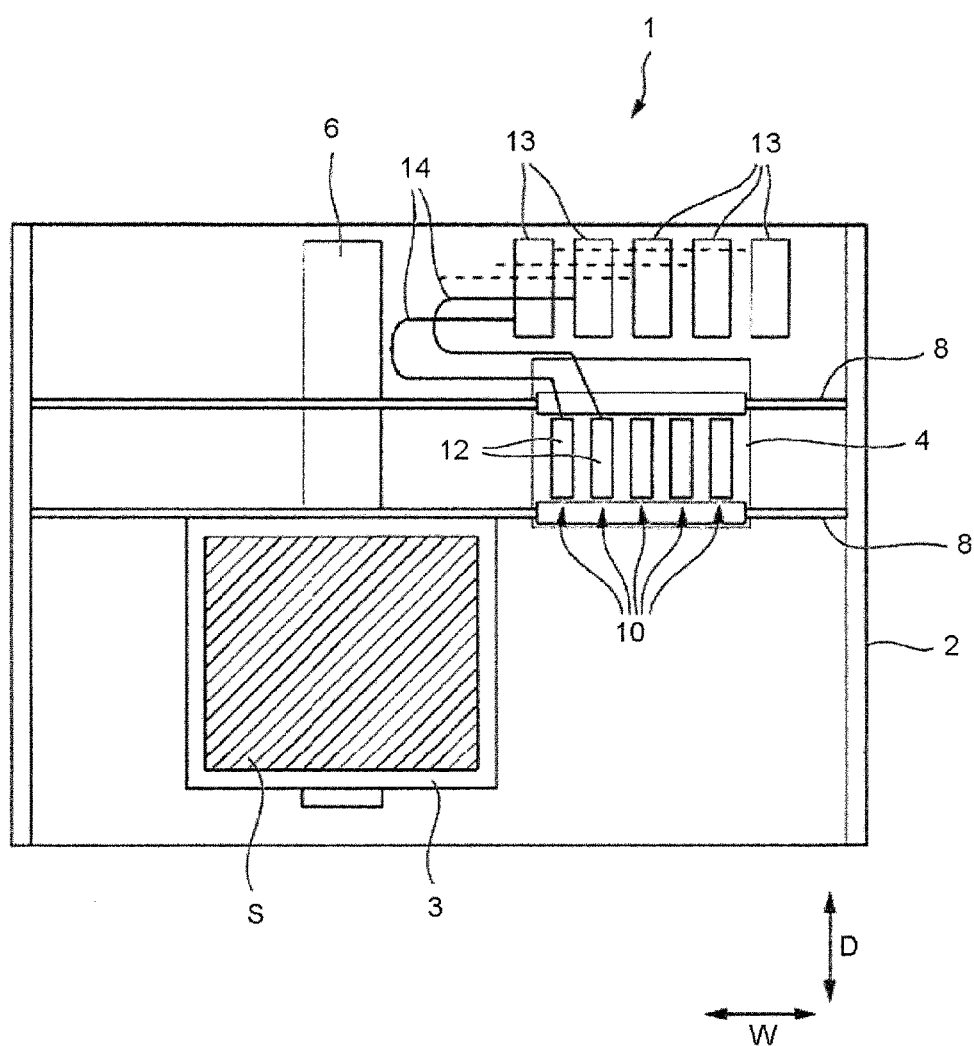
FIG. 1 is a plan view schematically illustrating an inkjet recording device according to an embodiment.

Hereinafter, an ink supply device and an inkjet recording device of an embodiment are described with reference to the accompanying drawings FIG. 1 is a plan view of an inkjet recording device 1 in which a part of a casing 2 is split open according to the embodiment.

The inkjet recording device 1 includes a feed table 3 and a carriage 4 in the casing 2. The feed table 3 is slidably held by a guide rail for feeding 6 arranged in the casing 2. The guide rail for feeding 6 linearly extends in a substantially horizontal direction. The feed table 3 is moved and operated in a direction along the guide rail for feeding 6 by a motor (not shown). Furthermore, an image receiving medium S is not limited to a sheet, and may be a resin film or a metal film, or a wooden plate.

The carriage 4 is slidably held by a guide rail for scanning 8 arranged in the casing 2. The guide rail for scanning 8 linearly extends in a substantially horizontal direction orthogonal to the guide rail for feeding 6. The carriage 4 is moved and operated in a direction along the guide rail for scanning 8 by a motor (not shown).

In the carriage 4, inkjet units 10 of which the number corresponds to types of ink to be ejected to the image receiving medium S are loaded. The ink ejected from each inkjet unit 10 can use transparent gloss ink or special ink that develops a color when irradiated with infrared rays or ultraviolet rays in addition to ink with different colors such as cyan, magenta, yellow, black and white.

Figure 2:
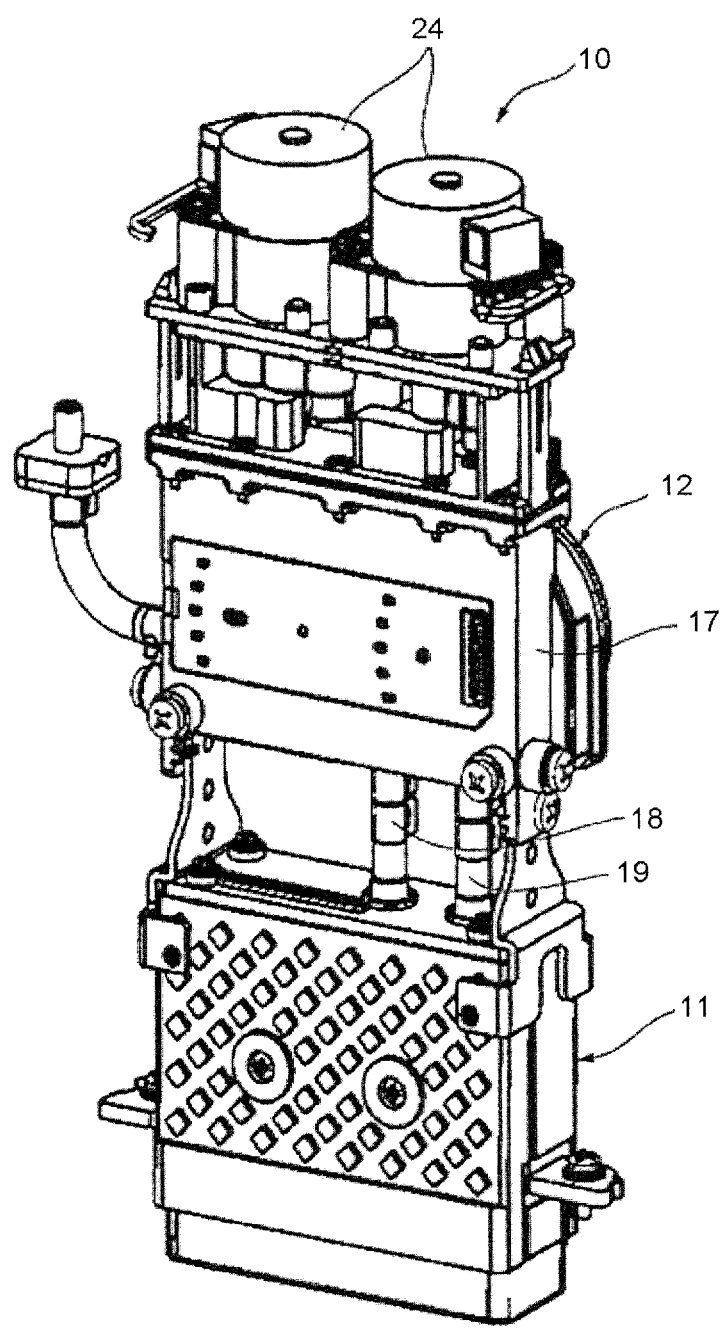
FIG. 2 is a perspective view of an inkjet unit according to the embodiment.
Figure 3:
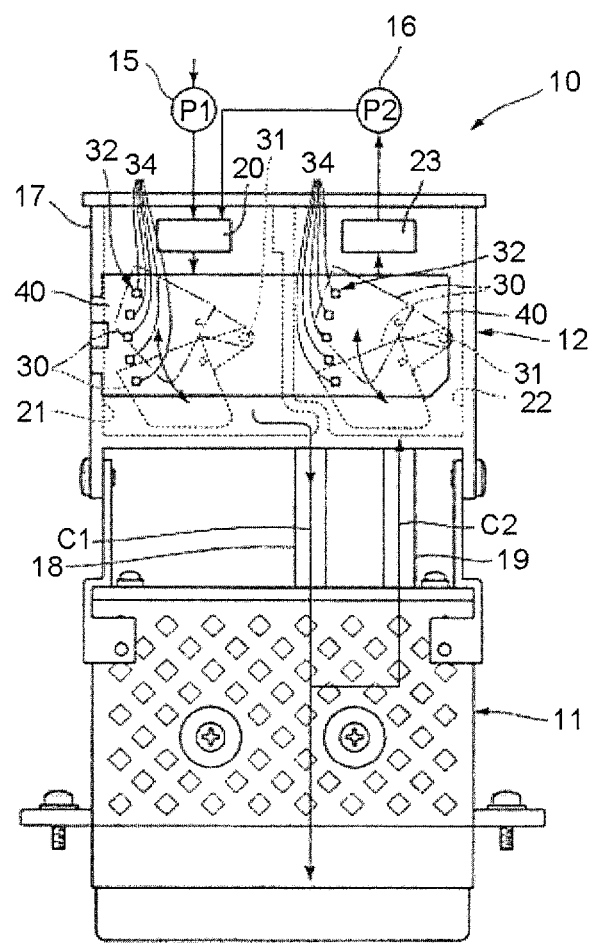
FIG. 3 is a front view of the inkjet unit according to the embodiment.

FIG. 2 is a diagram illustrating one inkjet unit 10 when viewed from oblique upside, and FIG. 3 is a front view illustrating the inkjet unit 10 added with an internal schematic flow path. The inkjet unit 10 is provided with an inkjet head 11 for ejecting ink to the image receiving medium S and an ink supply device 12 combined with the inkjet head 11 at the upper part side of the inkjet head 11.

An corresponding ink cartridge 13 arranged in the casing 2 is connected with the ink supply device 12 of each inkjet unit 10. The ink supply device 12 of each inkjet unit 10 and the corresponding ink cartridge 13 are connected by a connection tube 14 which includes flexibility.

A plurality of the inkjet units 10 is collectively arranged on the carriage 4, and moves together with the carriage 4 along the guide rail for scanning 8. The carriage 4 moves in a range crossing with a moving track of the feed table 3 when the ink is ejected from the inkjet head 11 to the image receiving medium S on the feed table 3.

The inkjet head 11 of each inkjet unit 10 is provided with a plurality of nozzle sections (not shown) for ejecting the ink to the image receiving medium S, and an actuator (not shown) arranged to face each nozzle section. The actuator is constituted by, for example, a piezoelectric vibrating membrane using piezoelectric ceramic. The structure of the actuator is not limited to this structure, and may be other structures as long as pressure of the ink can be increased according to an input signal. The inkjet recording device 1 according to the present embodiment properly moves the carriage 4 which is loaded with the inkjet unit 10 and the feed table 3 on which the image receiving medium S is placed linearly in a case in which printing corresponding to the input signal is carried out on the image receiving medium S, and jets the ink from a specific nozzle section corresponding to the input signal of the inkjet head 11.

In the inkjet unit 10, the ink supply device 12 is integrally combined with the upper part of the inkjet head 11 as stated above. The ink supply device 12 according to the present embodiment includes a supply route c1 for supplying the ink introduced from an external ink cartridge 13 to the inkjet head 11 and a return route c2 for returning the ink which is not jetted from the nozzle section of the inkjet head 11 as shown in FIG. 3. The ink supply device 12 includes a casing 17 in which a first pump 15 and a second pump 16 are built. The casing 17 includes an ink supply tube 18 for supplying the ink to the nozzle section of the inkjet head 11 and an ink return tube 19 for returning the ink which is not jetted by the nozzle section of the inkjet head 11 from the inkjet head 11.

The first pump 15 is a supply pump for replenishing the ink corresponding to an amount consumed by printing and a maintenance operation from the ink cartridge 13 and supplying the ink to the inkjet head 11. An ejection chamber 20 is formed in the casing 17. The ejection chamber 20 is arranged to face an ejection section of the first pump 15 at the upstream part of the supply route c1 of the ink facing the inkjet head 11.

A supply side ink storage section 21 and a collection side ink storage section 22 which can temporarily store the ink are formed inside the casing 17. The supply side ink storage section 21 is adjacently arranged at the downstream part of the ejection chamber 20 in the casing 17. The ink supply tube 18 is connected with the supply side ink storage section 21. The ink stored in the supply side ink storage section 21 is supplied to the inkjet head 11.

The ink return tube 19 is connected with the collection side ink storage section 22. The ink which is not jetted by the inkjet head 11 flows into the collection side ink storage section 22 via the ink return tube 19. The collection side ink storage section 22 is arranged in the return route c2 in the casing 17. A suction chamber 23 is adjacently arranged at the downstream side of the return route c2. A suction section of the second pump 16 is arranged in the suction chamber 23 and faces the suction chamber 23.

The second pump 16 is a reflux pump for returning the ink flowing into the suction chamber 23 from the collection side ink storage section 22 to the ejection chamber 20. An ejection section of the second pump 16 is arranged facing the ejection chamber 20. The ejection sections of the first pump 15 and the second pump 16 are arranged in parallel and face the ejection chamber 20. The ink supply device 12 according to the present embodiment circulates the ink between it and the inkjet head 11 by taking the second pump 16 as a drive source.

Further, upper parts of ink surfaces in the supply side ink storage section 21 and in the collection side ink storage section 22 are set as air chambers. Pressure in each air chamber is detected by a pressure sensor (not shown). A pressure adjustment section 24 is arranged on the upper part of the casing 17 as shown in FIG. 3. The pressure adjustment section 24 adjusts the pressure of the ink supplied to the inkjet head 11 to proper pressure according to a detection result of the pressure sensor.

Figure 4:
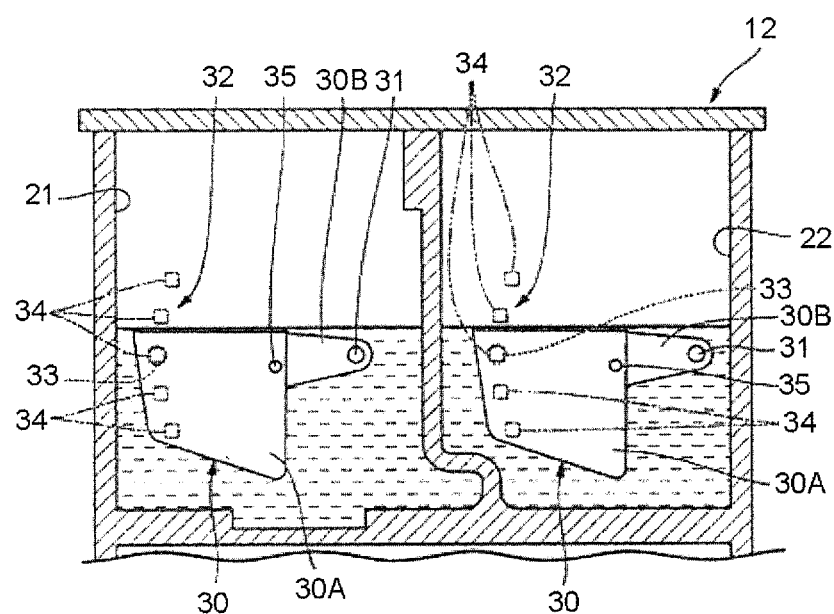
FIG. 4 is a longitudinal section view of a part of the inkjet unit according to the embodiment.
Figure 5:
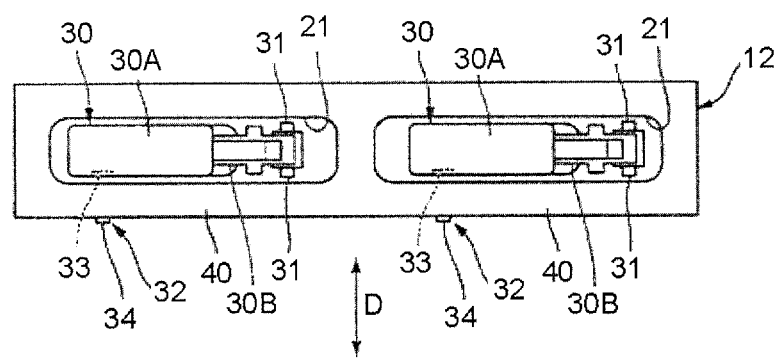
FIG. 5 is a top view of the inkjet unit of which partial components are removed according to the embodiment.

FIG. 4 is a diagram illustrating cross sections of the supply side ink storage section 21 and the collection side ink storage section 22 of the inkjet unit 10 in the longitudinal direction, and FIG. 5 is a diagram in which a part of the casing 17 is removed and which illustrates the supply side ink storage section 21 and the collection side ink storage section 22 when viewed from upside. Furthermore, hereinafter, for the sake of description, a direction facing an arrow D in FIG. 5 is called a depth direction. As shown in FIG. 4 and FIG. 5, the supply side ink storage section 21 and the collection side ink storage section 22 have substantially rectangular shape internal spaces of which widths in the depth direction Dare narrow, and floats 30 are arranged in the internal spaces. The floats 30 are floated in response to the heights of the liquid surfaces of the ink stored inside the supply side ink storage section 21 and the collection side ink storage section 22.

Figure 6:
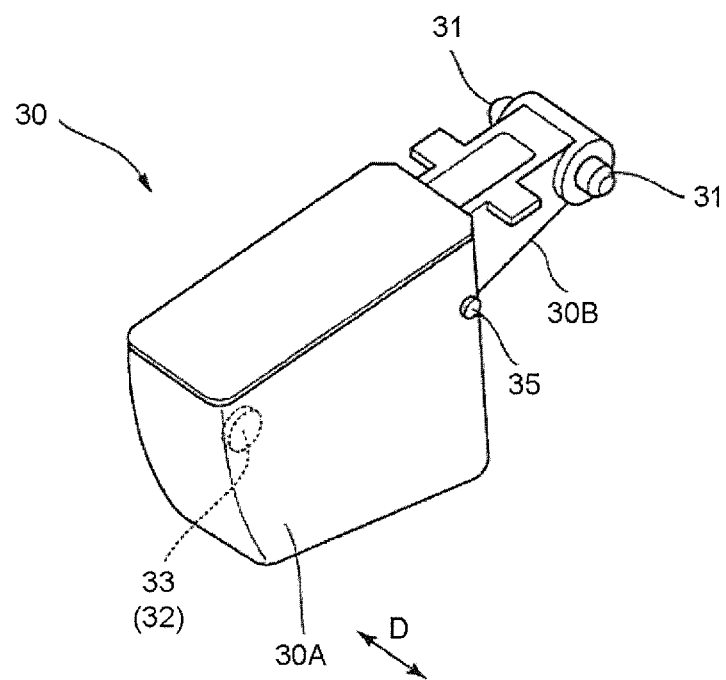
FIG. 6 is a perspective view of a float according to the embodiment.

FIG. 6 is a perspective view of the single float 30. The float 30 includes a float main body 30A which includes a cavity part therein and of which the width in the depth direction D is narrow, and an arm section 30B extends from the upper part of the float main body 30A in a direction substantially orthogonal to the depth direction D. A rotating shaft 31 protruding to both sides of the depth direction D is projected on the extending end of the arm section 3B. The rotating shaft 31 is rotatably supported on each wall of the supply side ink storage section 21 and the collection side ink storage section 22. Thus, the float 30 is rotated around the rotating shaft 31 in response to the height of the liquid surface of the ink stored inside the supply side ink storage section 21 or the collection side ink storage section 22.

A floating position detection device 32 for detecting a floating position of the float 30 is arranged in the supply side ink storage section 21 and on the float 30 which is arranged in the supply side ink storage section 21. Further, the same floating position detection device 32 is arranged in the collection side ink storage section 22 and on the float 30 which is arranged in the collection side ink storage section 22. The floating position detection devices 32 with the same configuration are used at the supply side ink storage section 21 side and the collection side ink storage section 22 side, and thus, hereinafter, the configuration of the floating position detection device 32 is described by exemplifying the supply side ink storage section 21 side.

The floating position detection device 32 includes a permanent magnet 33 arranged on the float main body 30A, and a plurality of magnetic detection sensors 34 arranged on a wall 40 at one side in the depth direction D of the supply side ink storage section 21. The permanent magnet 33 is buried at a position incident to one side in the depth direction D in the float main body 30A. The magnetic detection sensor 34 can use, for example, a magneto-electric conversion element such as a Hall IC.

The plurality of the magnetic detection sensors 34 is arranged at positions substantially along an arc-shaped moving track of the permanent magnet 33 on the float 30 on the wall 40 at one side in the depth direction D of the supply side ink storage section 21. The wall 40 at one side in the depth direction D of the supply side ink storage section 21 is arranged substantially orthogonal to an axial direction of the rotating shaft 31 of the float 30, and thus, a separation width in the depth direction D between the permanent magnet 33 on the float main body 30A and each magnetic detection sensor 34 on the wall 40 is always kept almost constant regardless of the change of the rotational position of the float main body 30A. A signal detected by the magnetic detection sensor 34 is input to a control device (not shown) for controlling the pressure adjustment section 24 or the first pump 15, the second pump 16 and the like.

In the case of the present embodiment, the plurality of the magnetic detection sensors 34 which is separated from each other is arranged on the wall 40 at one side in the depth direction D of the supply side ink storage section 21; however, the adjacent magnetic detection sensors 34 are arranged on the wall 40 at a separation distance in which a manual magnetism detectable region is trapped. Furthermore, in the present embodiment, the permanent magnet 33 constitutes a detection target, and the magnetic detection sensor 34 constitutes a target detection section. However, the detection target and the target detection section are not limited to the permanent magnet 33 and the magnetic detection sensor 34, and for example, the target detection section may be constituted by a photoelectric sensor which includes a light emitting section and a light receiving section, and the detection target may be constituted by a light shielding plate.

Further, in the float 30 of the embodiment, fine projection 35 facing inner surfaces of the wall 40 is projected at left and right side surfaces of the float main body 30A. The projection 35 abuts against the inner surfaces of the wall 40 suitably at the time of the float of the float 30 to keep a gap between the float main body 30A and the wall 40 constant or more and to prevent adsorption of the float 30 to the wall 40 due to the ink.

In the ink supply device 12 according to the present embodiment, the magnetic detection sensor 34 which constitutes the floating position detection device 32 together with the permanent magnet 33 is arranged on the wall 40 substantially orthogonal to the rotating shaft 31 of the float 30 of each of the supply side ink storage section 21 and the collection side ink storage section 22. Thus, a setting position of the magnetic detection sensor 34 capable of stably detecting the position of the permanent magnet 33 can be easily guaranteed in the wide range of the supply side ink storage section 21 and the collection side ink storage section 22. In other words, the separation width in the depth direction D of the wall 40 substantially orthogonal to the rotating shaft 31 of the float 30 of the supply side ink storage section 21 or the collection side ink storage section 22 with respect to the side part of the float 30 on which the permanent magnet 33 is arranged is kept almost constant in the whole area, and thus, the setting position of the magnetic detection sensor 34 is difficult to restrict. Thus, the degree of freedom of setting of the target detection section can be increased by adopting the ink supply device 12 according to the present embodiment.

Further, in the ink supply device 12 according to the present embodiment, the plurality of the magnetic detection sensors 34 serving as the target detection sections is arranged at the positions substantially along the arc-shaped moving track of the permanent magnet 33 on the wall 40. Thus, in a case of adopting the ink supply device 12 according to the present embodiment, the liquid surface of the ink over a wide range can be accurately detected.

In particular, in the ink supply device 12 according to the present embodiment, the adjacent magnetic detection sensors 34 are arranged on the wall 40 at the separation distance in which the manual magnetism detectable region is trapped, and thus, the liquid surface of the ink over a continuous wide range can be accurately detected.

Further, the ink supply device 12 according to the present embodiment adopts the permanent magnet 33 as the detection target and the magnetic detection sensor 34 as the target detection section, and thus, detection accuracy is high due to the simple configuration, and the miniature floating position detection device 32 can be constituted.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An ink supply device, comprising:
  an ink storage section connected with an inkjet head and configured to store ink to be supplied to the inkjet head;
  a float arranged in the ink storage section configured to float on a liquid surface of the ink to indicate a height of the ink in the ink storage section; and
  a floating position detection device configured to detect a floating position of the float in the ink storage section, wherein
  the float is supported rotatably around a rotating shaft in the ink storage section;
  the floating position detection device comprises a detection target arranged on the float, and a target detection section which is arranged in the ink storage section and detects that the detection target approaches; and
  the target detection section is arranged on a wall substantially orthogonal to an axial direction of the rotating shaft of the ink storage section.

2. The ink supply device according to claim 1, wherein a plurality of the target detection sections is arranged at positions substantially along an arc-shaped moving track of the detection target on the wall.

3. The ink supply device according to claim 2, wherein adjacent target detection sections are arranged on the wall at a separation distance in which a manual detectable area is trapped.

4. The ink supply device according to claim 1, wherein the detection target is constituted by a permanent magnet, and the target detection section is constituted by a magnetic detection sensor.

5. The ink supply device according to claim 1, wherein the ink comprises one or more of cyan, magenta, and yellow ink.

6. The ink supply device according to claim 1, wherein the ink comprises black ink.

7. An inkjet recording device, comprising:
  an inkjet head configured to jet ink to an image receiving medium; and
  an ink supply device, wherein
  the ink supply device comprises:

an ink storage section connected with an inkjet head and configured to store ink to be supplied to the inkjet head;

a float arranged in the ink storage section configured to float on a liquid surface of the ink to indicate a height of the ink in the ink storage section; and a floating position detection device configured to detect a floating position of the float in the ink storage section, wherein the float is supported rotatably around a rotating shaft in the ink storage section;

the floating position detection device comprises a detection target arranged on the float, and a target detection section which is arranged in the ink storage section and detects that the detection target approaches; and the target detection section is arranged on a wall substantially orthogonal to an axial direction of the rotating shaft of the ink storage section.

8. The inkjet recording device according to claim 7, wherein a plurality of the target detection sections is arranged at positions substantially along an arc-shaped moving track of the detection target on the wall.

9. The inkjet recording device according to claim 8, wherein adjacent target detection sections are arranged on the wall at a separation distance in which a manual detectable area is trapped.

10. The inkjet recording device according to claim 7, wherein the detection target is constituted by a permanent magnet, and the target detection section is constituted by a magnetic detection sensor.

11. The inkjet recording device according to claim 7 comprising a plurality of inkjet heads and a corresponding plurality of ink storage sections.

12. The inkjet recording device according to claim 11, wherein the plurality of ink storage sections comprises a cyan ink storage section, a magenta ink storage section, and a yellow ink storage section.

13. The inkjet recording device according to claim 7, wherein the ink storage section comprises a black ink storage section.

14. A method of monitoring ink supply for an inkjet head, comprising:

storing ink in an ink storage section to be supplied to an inkjet head;

floating a float on a liquid surface of the ink to indicate a height of the ink in the ink storage section;

detecting a floating position of the float in the ink storage section;

supporting the float rotatably around a rotating shaft in the ink storage section; and detecting an approaching detection target on the float, wherein a target detection section is arranged on a wall substantially orthogonal to an axial direction of the rotating shaft of the ink storage section.

15. The method according to claim 14, wherein a plurality of the target detection sections is arranged at positions substantially along an arc-shaped moving track of the detection target on the wall.

16. The method according to claim 15, wherein adjacent target detection sections are arranged on the wall at a separation distance in which a manual detectable area is trapped.

17. The method according to claim 14, wherein the detection target is constituted by a permanent magnet, and the target detection section is constituted by a magnetic detection sensor.

18. The method according to claim 14, wherein the ink comprises one or more of cyan, magenta, and yellow ink.

19. The method according to claim 14, wherein the ink comprises black ink.

* * * * *